United States Patent [19]

Bergquist

[11] 4,358,341

[45] Nov. 9, 1982

[54] SPRAY DRYER

[75] Inventor: Dwight H. Bergquist, Omaha, Nebr.

[73] Assignee: Henningsen Foods, Inc., White Plains, N.Y.

[21] Appl. No.: 247,924

[22] Filed: Mar. 26, 1981

Related U.S. Application Data

[63] Continuation of Ser. No. 828,634, Aug. 29, 1977, abandoned.

[51] Int. Cl.³ ............................................. B01D 1/14
[52] U.S. Cl. .................................... 159/4 B; 159/4 F; 261/116
[58] Field of Search ............. 159/4 R, 4 A, 4 B, 4 C, 159/4 F, 48; 261/116

[56] References Cited

FOREIGN PATENT DOCUMENTS 2148051 4/1973 Fed. Rep. of Germany ...... 159/4 B

*Primary Examiner*—Norman Yudkoff
*Attorney, Agent, or Firm*—Alexander C. Wilkie, Jr.

[57] ABSTRACT

An improved spray dryer is disclosed for drying heat sensitive food products under sanitary conditions with a maximum product recovery for a minimal dryer size. The dryer has an air flow system for moving air through a drying chamber at generally atmospheric pressure with a controlled laminar air flow. The product being dried is sprayed into the drying chamber by an air distributor plate with a relatively rapid air flow through and immediately surrounding the product spray and with a surrounding air flow of lower velocity. The dried droplets or powder are removed by a powder collector including a drag system.

1 Claim, 5 Drawing Figures

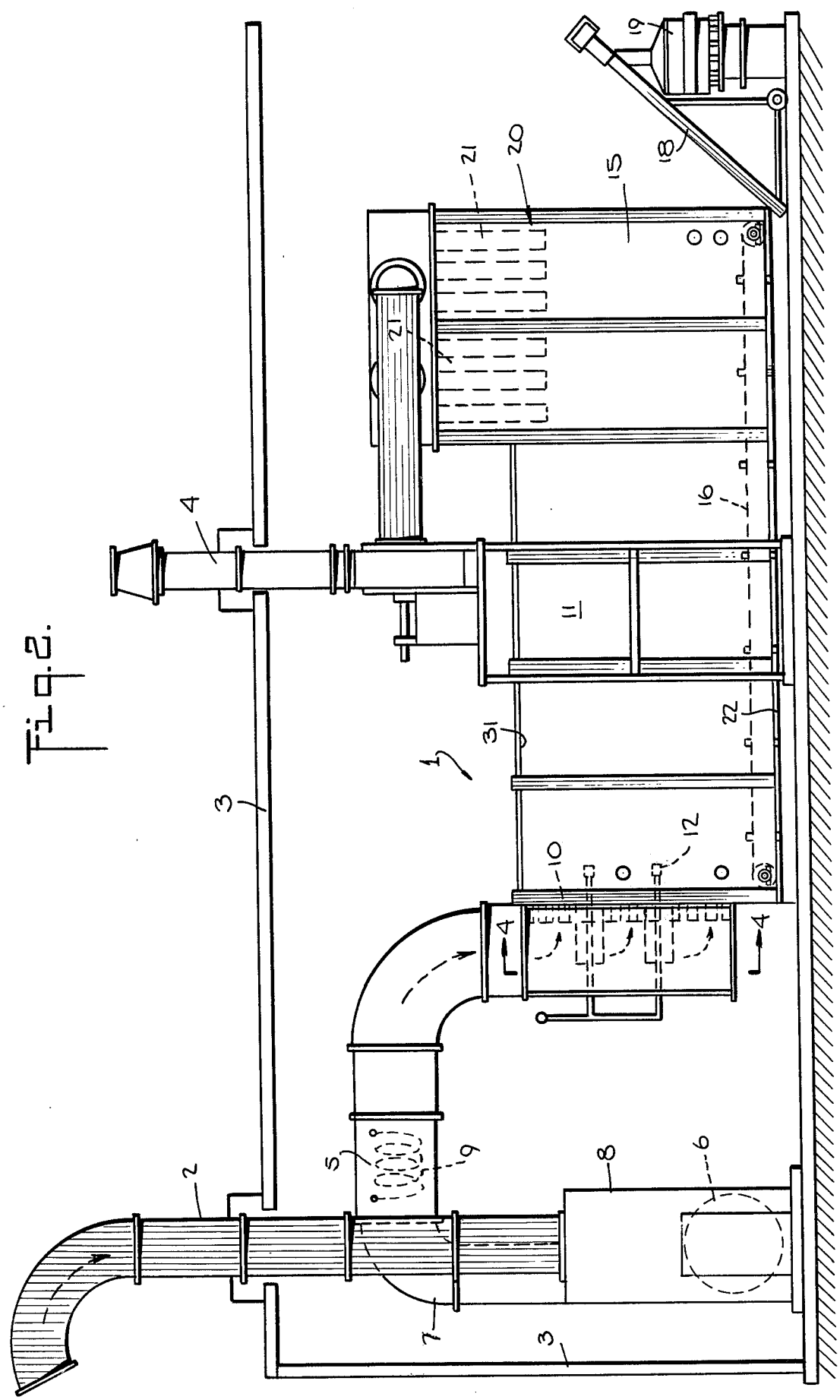

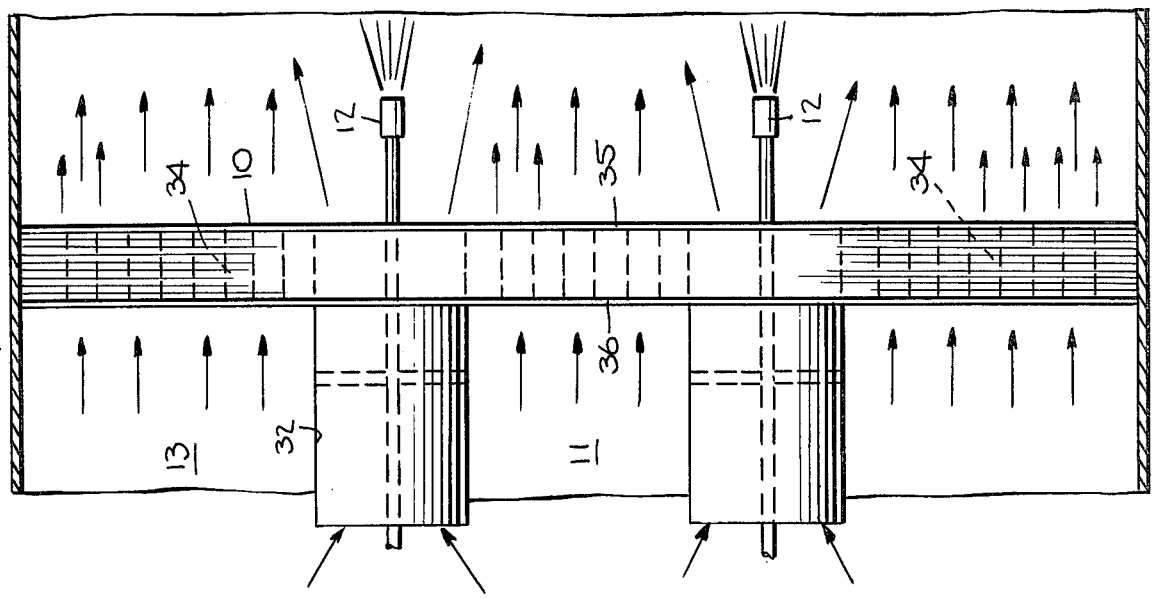
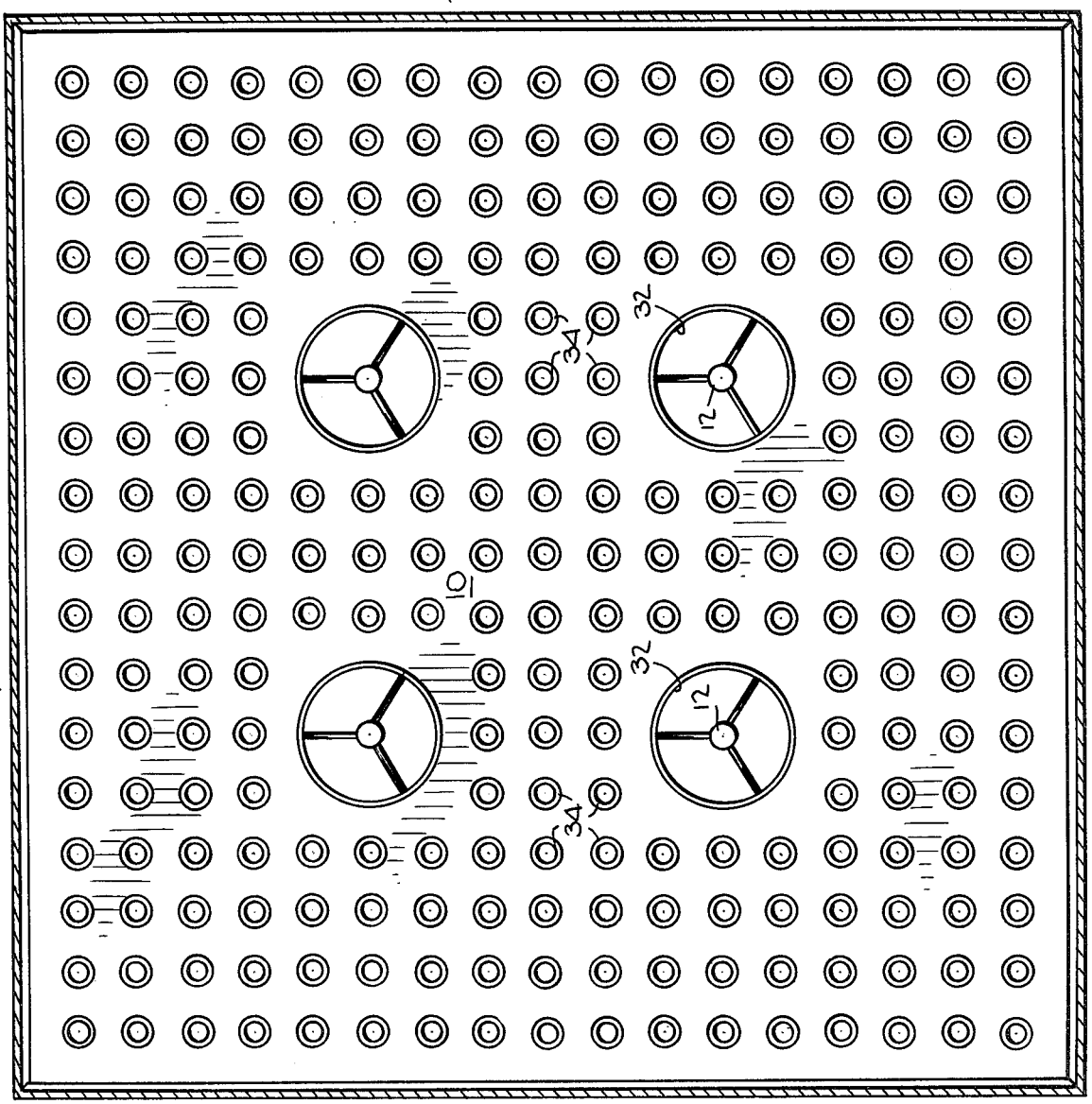

SPRAY DRYER

This is a continuation of application Ser. No. 828,634 filed August 29, 1977 now abandoned.

BACKGROUND OF THE INVENTION

The present invention relates to improved method and means for spray drying and, more particularly, to an improved method and means for drying products such as heat sensitive food products under sanitary conditions.

The improved spray drying system and in particular the improved and cooperating atomizing means and air flow control means permit effective and rapid drying at minimum temperatures to eliminate undesirable product over-heating.

The spray dryer and method of the present invention are an improvement upon prior drying method and means, for example, upon the spray drying method and means as described in applicant's U.S. Pat. No. 3,648,753 dated Mar. 14, 1972. A drying system is disclosed in that patent which includes means for controlling drying air flow and product atomizing. The present invention provides significant improvements in the drying by the use of the improved drying means to be described in detail below.

In particular, the improved drying includes a tubular type of air distributor plate positioned at a number of atomizing nozzles. These elements combine with each other and with the preferred overall air flow control and air drying chamber to produce a more rapid and more uniform product drying at minimum drying temperatures.

Accordingly, an object of the present invention is to provide an improved spray drying method and means for heat sensitive products including food products.

Another object of the present invention is to provide a spray dryer with improved air flow control resulting in a more uniform and more efficient spray drying action at minimal temperatures.

Another object of the present invention is to provide an improved spray dryer which minimizes any chance of product contamination.

Another object of the present invention is to provide a spray dryer having a maximum product output for a given dryer size.

Another object of the present invention is to provide an improved air distributor plate for a spray dryer.

Another object of the present invention is to provide a method and means of spray drying products having a high product density.

Other and further objects of the invention will be obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawings, forming a part of the specification, wherein:

FIG. 2 is a front elevational view of a preferred embodiment of the spray drying means in accordance with the present invention.

FIG. 4 is a vertical sectional view of the air distribution plate taken along line 4—4 on FIG. 2.

FIG. 5 is a vertical sectional view of FIG. 4 taken along line 5—5 on FIG. 4.

FIG. 8 is a perspective view illustrating the product removing drag means.

FIG. 9 is a horizontal sectional view taken along line 9—9 on FIG. 8.

DESCRIPTION OF THE PREFERRED EMBODIMENT

Figure 1:
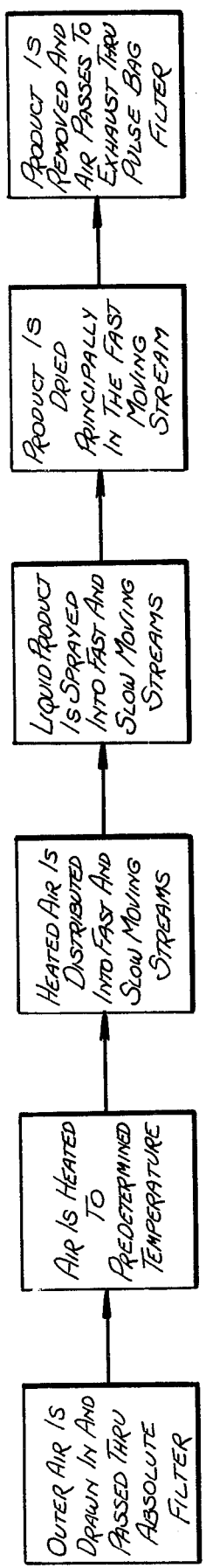
FIG. 1 is a flow diagram of the operation of the improved spray drying method and means.
Figure 3:
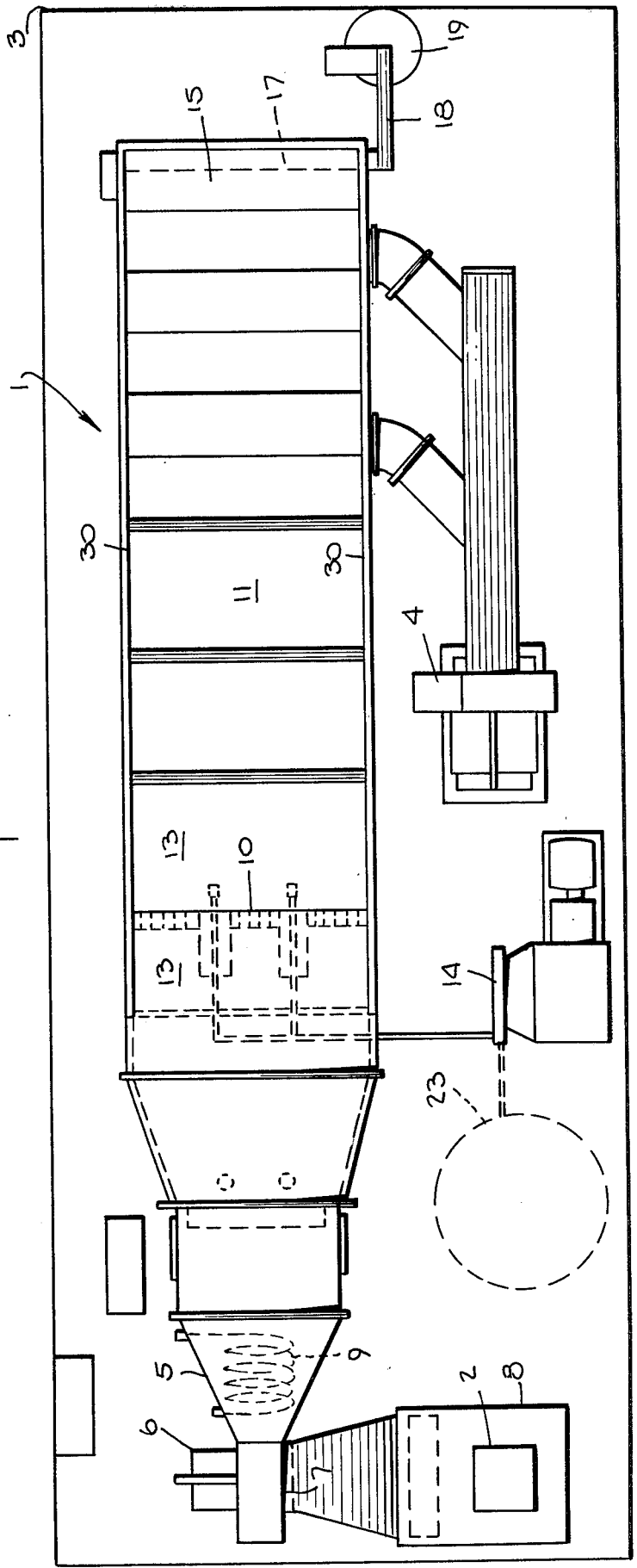
FIG. 3 is a top plan view of the spray dryer of FIG. 2.

The improved air dryer and its method of operation will first be described generally with particular reference to FIGS. 1, 2 and 3. While the spray dryer 1, as described below, is conventionally installed in a suitable plant, it is preferred that the air being used in the drying operation be supplied from and returned to the outdoors. For this purpose, the spray dryer 1 has an elongated air inlet 2 for the drying air supply which extends outside of the dryer building 3. Similarly, an elongated air outlet 4 is connected by suitable exhaust piping to the exit end of the spray dryer 1. The dryer 1 includes a heater 5 to raise the temperature of the air from inlet 2, under suitable thermostatic control, to the desired drying temperature. Air is fed to and through the heater 5 by means of an inlet air blower 6 coupled by suitable ducting 7 to the air heater 5. The air inlet 2 includes a filter housing 8 containing a roughing filter and a high efficiency absolute filter of the type commercially used in air flow filtering operations which will remove as much as 99.97% of all contaminants from the incoming air.

The air heater 5 may use heated coils 9 (FIG. 3) or it may employ direct or indirect heating furnace 5 employing suitable fuels such as oil or gas.

The heated air is fed downwardly to an air flow manifold 13 which communicates through an air distribution plate 10 to the drying chamber 11 of the dryer 1. A number of atomizing nozzles 12 are mounted on the air distribution plate 10 which are coupled through an adjustable fluid feed system 14 to a suitable source 23 of the liquid being dried. The construction and operation of the air distribution plate 10 and the related atomizing nozzles 12 will be described in greater detail below.

The drying chamber 11 terminates in a discharge end 15 which completes the removal of the dried or powdered product from the air flow permitting the separated air to pass upwardly to the air outlet 4. The dried product drops to the floor of the drying chamber 11 and is moved in the direction of air flow by a drag system 16 to the bottom of the discharge chamber 15. A horizontal auger 17 carries the dried product to a removal auger 18 which feeds the dried powder to a vibrating sifter 19.

A final removal of any remaining dried product in the air stream is done at an outlet filter 20. A preferred filter is a pulse-type bag filter. These commercial available filters position a number of filter bags 21 at the air outlet. The air passes through the bags 21 and upwardly through the air outlet 4. Any dried powder which has not already dropped to the drying chamber 11 floor 22 accumulates on the outer surfaces of the bags 21. This powder is removed from the bags 21 periodically as air is injected from a separate air source into the inside or filtered side of the bags 21 causing the bags 21 to expand. This counter air flow and the bag 21 expansion knocks any accumulated powder from the air bags 21 onto the floor 22 of the discharge end 15 of the drying chamber 11 where it is removed by the above described drag system 16 and the auger 17.

The drag system 16 has a pair of stainless steel sanitary chains 24 mounted on end sprockets 25 at the corners of the drying chamber bottom 22. The chains 24 are driven by a suitable electric drive system 26 to move elongated powder dragging flights 27 along the chamber bottom 22 to carry the dried powder to the exit auger 17. The flights 27 are metal such as aluminum or plastic. Support rods 28 are positioned to engage low friction plastic flight support pads 29 as the flights 27 are returned to the start of their powder moving run.

THE AIR DISTRIBUTION PLATE AND METHOD

The air distribution plate 10 provides an efficient mixing of the atomized product spray with the heated drying air. An air flow is required which provides a maximum and uniform exposure of the atomized product particles to the heated drying air. The desired exposure results in a high efficiency drying action whereby relatively lower drying temperatures are utilized to protect heat sensitive food products or other products from heat damage.

The air distribution plate 10, in accordance with the present invention, covers substantially the entire air entry end of the drying chamber 9 and directs a forward flow of air through the drying chamber 11 and generally parallel to the chamber 11 side walls 30, ceiling 31, and floor 22. A number of product atomizing nozzles 12 are mounted on the air distribution plate 10. They are coupled through the supply system 14 to the source of liquid products 23. Each of the atomizing nozzles 12 is mounted downstream from the air distribution plate 10 beyond a relatively large orifice or air nozzle 32. The air nozzles 32 pass air to and past the atomizing nozzles 12 at a relatively high velocity which picks up the atomized particles from the atomizing nozzles 12 and begins and completes a major portion of the particle drying.

The air distribution plate 10 also includes a large number of generally uniformly spaced relatively smaller air nozzles 34 which pass a lower velocity of air in air streams surrounding the above described higher velocity air streams from the larger nozzles 32. These lower velocity air streams suppress a back flow or back lash of higher velocity air in zones adjacent to the air distribution plate 10 and eventually blend further downstream with higher velocity air for drying particles in the final stages of the particle drying action. The overall and combined action of the high and low velocity streams provides for a uniform drying of the atomized product particles with the relatively long drying period permitting minimal air temperatures to be used for the air used in the drying process. For example, a space starting with a plane parallel to and about one foot downstream from the air distribution plate 10 to a plane further downstream from where the spray breaks into atomized droplets, air flow through and immediately surrounding the spray is at relatively high velocity because of the larger nozzle 32 flow in which the spray is positioned.

Surrounding the high velocity air from the nozzles 32 is the lower velocity air from nozzles 34 which eventually blends with the high velocity air as both air flows move downstream. The higher velocity air picks up the spray and does the major portion of the drying. The lower velocity air suppresses back lash of the higher velocity air and of the spray and eventually blends in with the higher velocity air and spray for the final stages of drying the atomized particles. This results in the uniform drying of the particles and allows sufficient drying time for the relatively low drying temperatures.

The controlled heated air drying as described above also has been found to provide for a relatively high product density so that the dried product occupies a minimum space. Improvements in density, for example, to provide a specific gravity of about 0.50 as contrasted with dried products from other spray dryers of from 0.30 to 0.45 have been realized. The increased density of the product reduces the package size for the processed product. This higher density is believed to result from the reduced tendency of the atomized particles to agglomerates before drying. This, in turn, results from the improved air flow control and the elimination of a back flow or back lash of the partially dried particles which permits particles to come together and to form into lumps of lower overall density.

The illustrated embodiment of an air distribution plate 10 utilizes four spray nozzles 12 where the smaller air nozzles 34 are about 2" in diameter and the large nozzles 32 are about 12" in diameter. The small nozzles are approximately 6" in length and the larger nozzles 32 are approximately two feet long. This array of large and small nozzles not only controls air flow near and beyond the atomizing nozzles, but it also provides for a heated air flow parallel to the drying chamber 11 walls 30, roof 31, and floor 22. An air flow is present a foot or two downstream from the larger nozzles 32 which may be as much as ten times the velocity of the air flow downstream from the smaller air nozzles 34.

At a distance from the air distribution plate 10, as for example, twelve feet downstream, the air flow through the chamber 11 cross-section becomes relatively uniform throughout the cross-section as a result of a blending process of the drying air.

Figure 6:
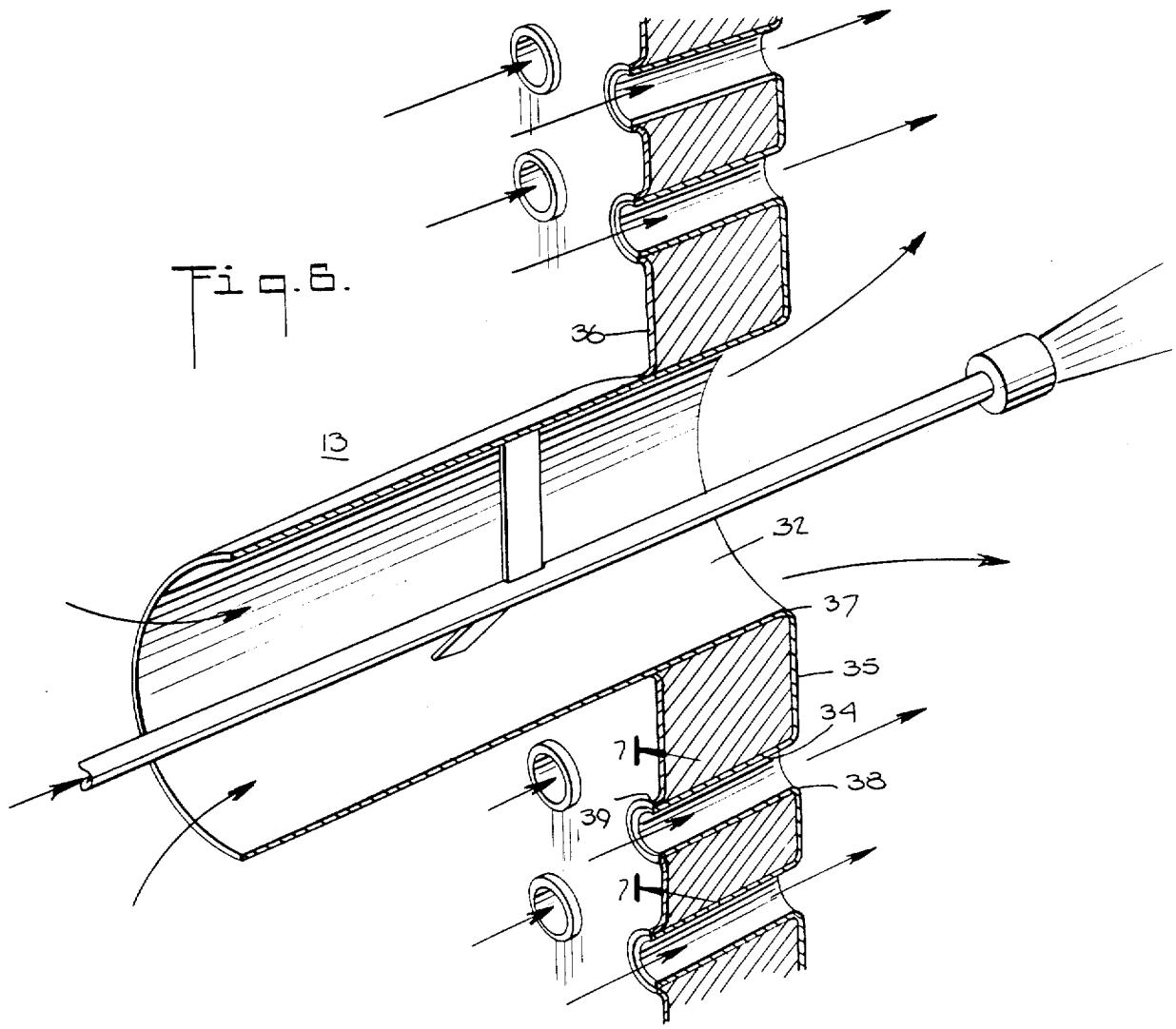
FIG. 6 is an enlarged fragmentary perspective view of the air distribution plate.
Figure 7:
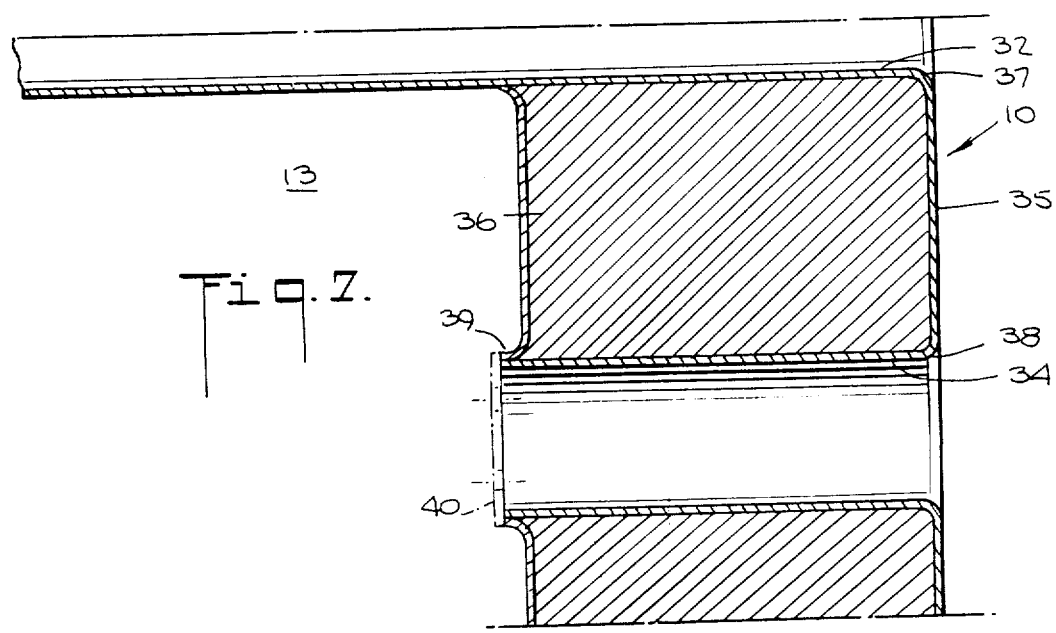
FIG. 7 is a vertical sectional view of an air distribution plate taken along line 7—7 on FIG. 6.

The above described air control is improved by a preferred shaping of the individual air nozzles. As illustrated in FIGS. 6 and 7, the individual air nozzles 32 and 34 have rounded or flared air outlets 37 and 38 which act both to prevent any build-up of dried product at the outlets and which also provide for a desirable flaring of the air flow from the individual air nozzles 32 and 34.

In the above described nozzles 32 and 34, a satisfactory flare is provided by rounded outlets 37 and 38 having a radius of approximately $\frac{1}{4}$". The individual nozzles 32 and 34 are mounted in spaced front and rear plates 35 and 36 to which the nozzles 32 and 34 are welded or otherwise fastened.

A typical air distribution plate, such as the above described plate 10 having four nozzles 12 and four large air nozzles 32, will have about 300 of the small air nozzles 34 uniformly spaced over the plate 10. The upstream or air entry portions of the individual nozzles 32 and 34 are conveniently welded or otherwise fastened to outwardly rounded aperture edges 39 on the rear plate 36.

The relative amounts of air flow through the larger and smaller nozzles 32 and 34 may be further adjusted by using added apertured plates 40 on the smaller nozzles 34. The number and size of apertures in the optional plates 40 is set to provide a desired air flow reduction through the nozzles 34.

It will be seen that an improved air dryer is provided which is particularly useful for drying powdered products including food products where a minimal drying temperature is desirable. The improved dryer operation including the improved control of the drying air flow also provides for a finished powder product of increased density to provide a finished product of reduced volume for more efficient handling and packaging. The dryer has a minimal size for the amount of product produced.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

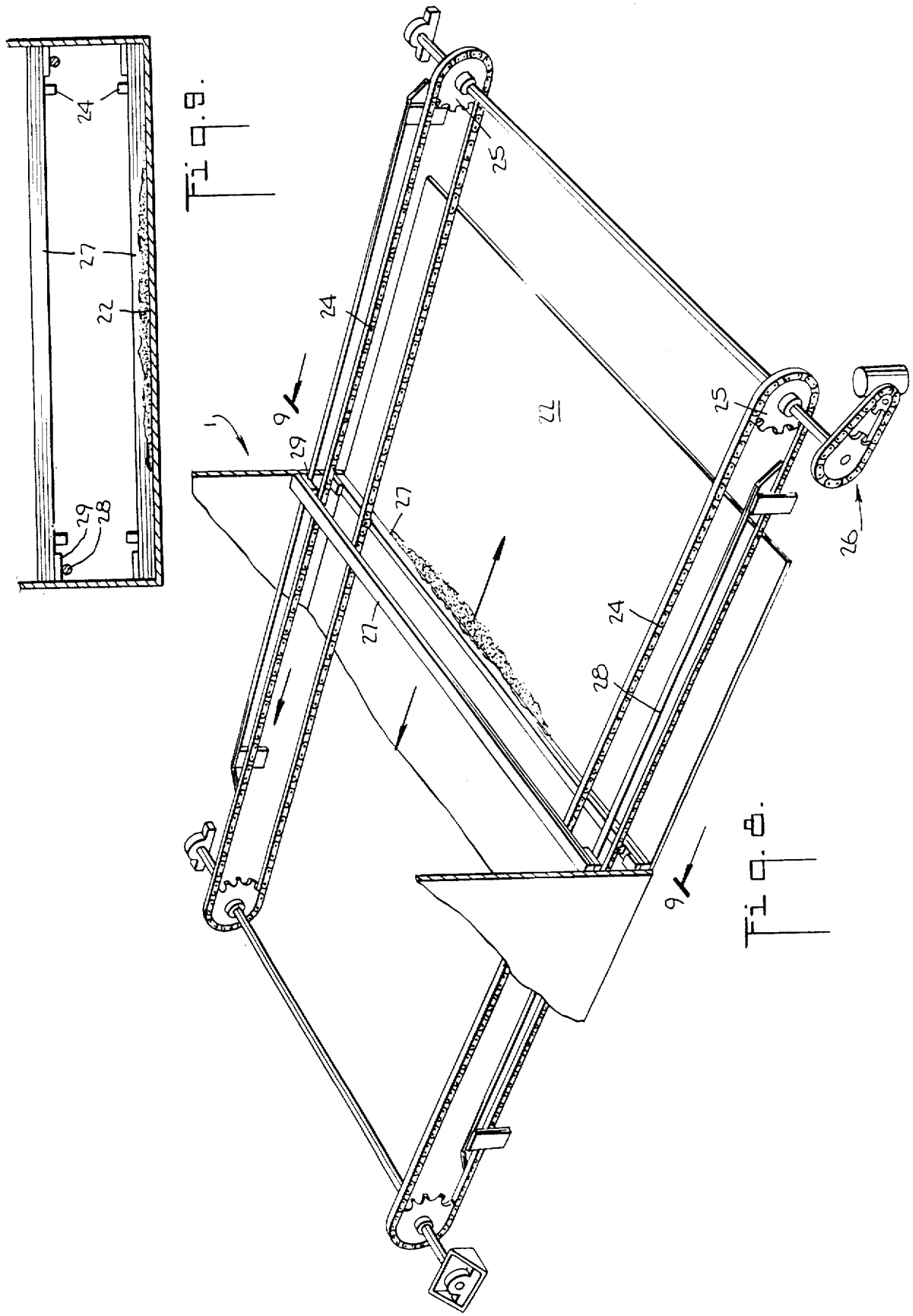

Having thus described my invention, I claim:

1. A horizontally disposed air supply manifold and a drying chamber having a flat top and side and bottom walls for directing air thru said drying chamber with a flow generally parallel to said walls throughout said chamber and having an initial flow pattern of a plurality of generally parallel streams of high velocity and streams of relatively low velocity and of thereafter having a single blended generally parallel flowing air stream having uniform velocity across the stream and having an air distribution plate therein comprising the combination of:

a flat plate member;

a plurality of elongated first cylindrically tubular nozzles mounted in spaced positions in said plate for passing air at relatively high velocity;

a plurality of relatively shorter and smaller diameter second elongated tubular nozzles mounted throughout said plate with generally uniform spacing and surrounding said first nozzles for passing air at a lower velocity;

said first and second nozzles having their axes positioned perpendicularly to said flat plate;

fluid atomizers mounted beyond the air outlets of said first nozzles, and means at the air exit ends of said first nozzles for causing a flare of the air flowing from said second nozzles.

* * * * *

UNITED STATES PATENT AND TRADEMARK OFFICE
CERTIFICATE OF CORRECTION

PATENT NO. : 4,358,341

DATED : November 9, 1982

INVENTOR(S) : Dwight H. Bergquist

It is certified that error appears in the above-identified patent and that said Letters Patent is hereby corrected as shown below:

The two sheets of drawing consisting of Figs 6-9, should be added as per attached sheet.

Signed and Sealed this

Twelfth Day of March, 1991

Attest:

HARRY F. MANBECK, JR.

*Attesting Officer*     *Commissioner of Patents and Trademarks*